June 7, 1955     H. B. CHATFIELD     2,709,848
METHOD OF LAMINATING METAL PARTS
Filed Dec. 5, 1951     2 Sheets-Sheet 1
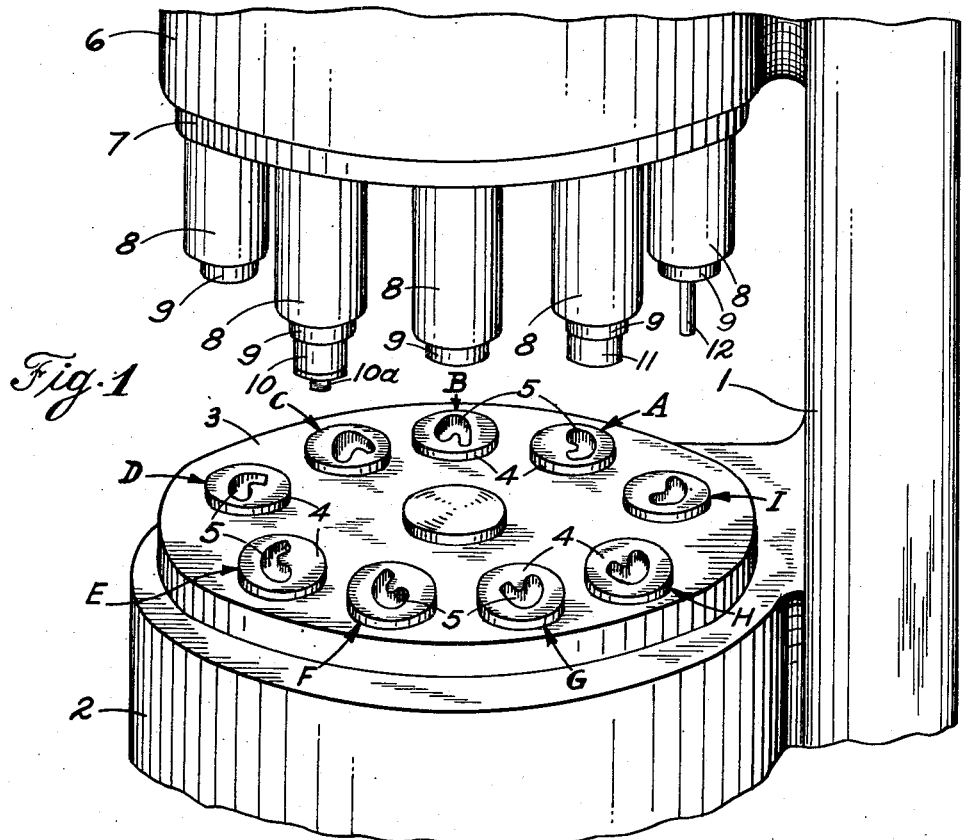
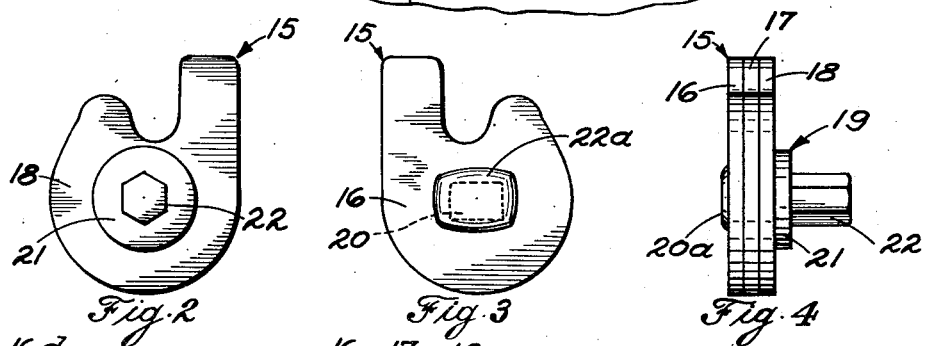
INVENTOR.
HENRY B. CHATFIELD
BY
Bosworth & Sessions
ATTORNEYS June 7, 1955 H. B. CHATFIELD 2,709,848
METHOD OF LAMINATING METAL PARTS
Filed Dec. 5, 1951 2 Sheets-Sheet 2
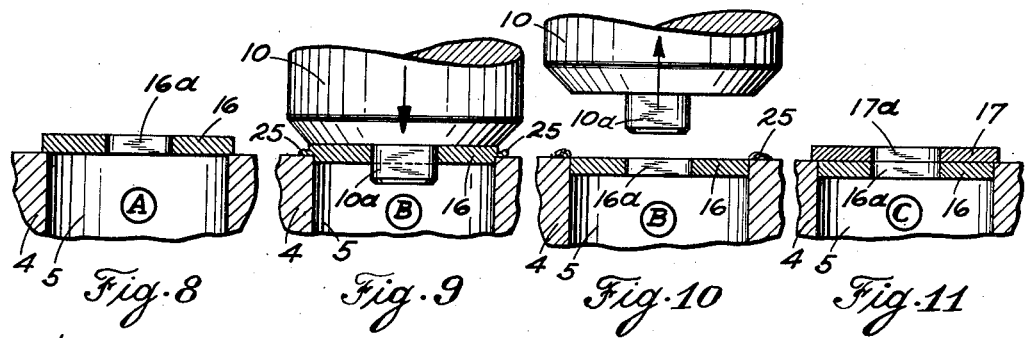
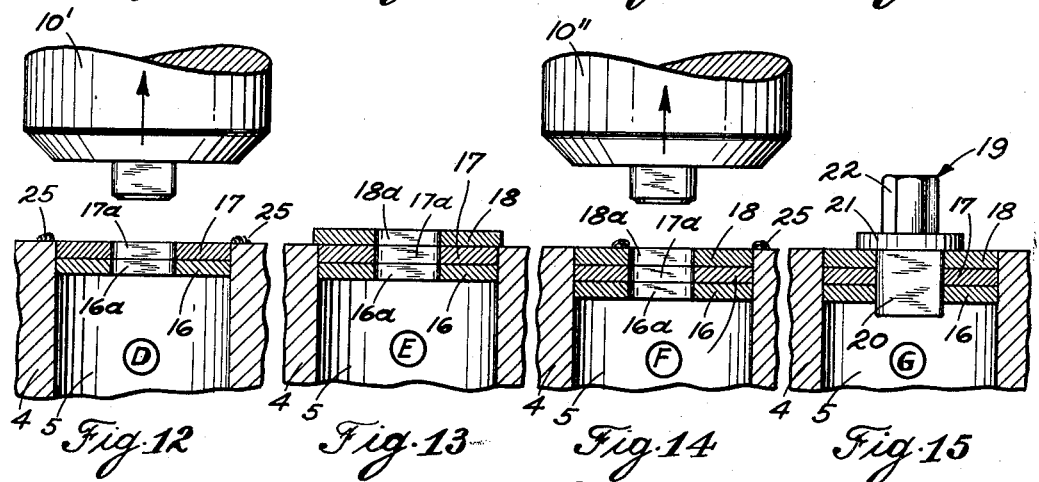
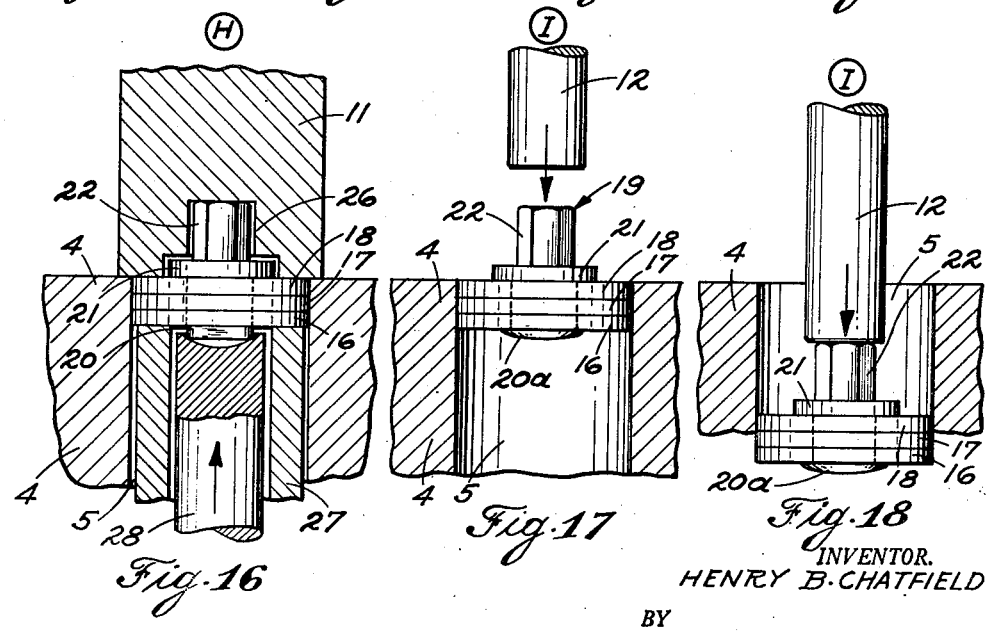
INVENTOR.
HENRY B. CHATFIELD
BY
Bosworth & Sessions
ATTORNEYS United States Patent Office 2,709,848
Patented June 7, 1955

2,709,848

METHOD OF LAMINATING METAL PARTS

Henry B. Chatfield, Kinsman, Ohio

Application December 5, 1951, Serial No. 259,980

3 Claims. (Cl. 29—526)

This invention relates to methods of making laminated-metal articles such as cams, gears, racks and the like.

Laminated-metal articles are known, being made according to conventional practice by superimposing two or more pieces of metal of the desired shape and dimensions, aligning them as well as possible to provide a substantial degree of registry, and fastening them together. This method of producing laminated-metal articles has the disadvantage that even under favorable conditions perfect registry is seldom obtained. For many uses, imperfect registry of the pieces of metal making up the article is not objectionable, but for other uses, especially where interengagement with another metal part is a factor, the likelihood of imperfect registry may operate to preclude the use of the laminated-metal article. Thus the field of usefulness of laminated-metal products has been restricted to some extent by what have been regarded as inescapable limitations.

It has now been found that laminated-metal products characterized by perfect registry can be made by the method hereinafter described, pursuant to which the blanks that are to form the laminated-metal article are forcibly introduced into a die under circumstances in which they are sheared, trimmed or shaved against the edges of the die in a manner such as to impart to them the transverse shape of the opening in the die. By superimposing a plurality of metal blanks on top of each other in the same die, each is sheared, trimmed or shaved in the same manner as each of the others. The process of assembly may vary somewhat but preferred practice involves assemblying the entire article in a die that is open on two sides, removing the article as a unit after assembly is complete by ejecting it from the bottom of the die without in the meanwhile removing any of the parts that go to make up the article. This permits of the maintenance of perfect registry of the metal blanks used in the laminated-metal article.

A principal object of the present invention is to provide a method of the kind described which, when carried out, will yield a laminated-metal article characterized by perfect registry. A further object of the invention is to provide a method of this kind in which all of the steps necessary to the assembly of the article are carried out in the die, obviating the necessity for supplemental steps such as copper brazing. A further object of the invention is to provide a method of this kind that can be carried out in a single multiple cavity machine of the transfer type, preferably one characterized by rotary movement about a vertical axis, in which there are separate stations for performing the several operations involved in the production of the laminated-metal article.

The invention in its preferred form is described in the following specification and illustrated in the accompanying drawings, in which Figure 1 is a somewhat diagrammatic perspective on a reduced scale showing a multiple cavity rotary transfer machine adapted for the production of laminated-metal articles such as cams, gears, racks, etc. Figures 2, 3 and 4 show posterior, anterior and end elevations of a cam made by the method of the present invention on a machine of the type illustrated in Figure 1, each of the three figures showing the cam on full scale. Figures 5, 6 and 7 show on the same scale the parts used in making the laminated-metal cam of Figures 2, 3 and 4. Figures 8 to 14, inclusive, illustrate the successive steps involved in forcibly introducing metal blanks into the die in circumstances in which the overlap can be shaved off in the form of a chip. Figure 15 shows the incompletely formed laminated-metal cam after the fastening element has been inserted in position. Figure 16 shows how a fastening tool, specifically a staking tool, may be used to fasten the parts together. Figures 17 and 18, taken together, show how the finished laminated-metal cam is ejected from the die in which it is assembled.

Referring first to Figure 1, what is there shown is a machine incorporating a fixed standard 1, a fixed lower support 2, a lower carrier 3 mounted in lower support 2 for rotation about a vertical axis, and, mounted in lower carrier 3, a series of nine female dies 4 provided with suitably shaped cavities 5, such dies being spaced equidistantly from each other near the periphery of lower carrier 3. Cooperating therewith is a fixed upper support 6 provided with an upper carrier 7, likewise mounted for rotation about a vertical axis, which is provided with a series of nine like plunger holders 8. Within each plunger holder is a plunger 9 adapted to be urged downward in known fashion by a hydraulic system so as to enable it to bring into juxtaposition to opening 5 in die 4 the tool or other object, if any, that is mounted on the plunger. As examples of the various objects that may be mounted on plungers 9 are the shearing punch 10, which is shown as provided with a pilot portion 10a, back-up punch 11, and, for purposes of ejection, knock-out pin 12. Normally when a machine of the kind shown in Figure 1 is used for the purpose of the present invention it will be provided with five operating plungers carrying three shearing punches 10, one back-up punch 11, and one knock-out pin 12, the other plungers, corresponding in number to the number of loading stations, being idle plungers.

In Figure 1 the several stations are indicated by letters A to I, inclusive. Of these, stations A, C and E are loading stations to each of which, by means not illustrated, preformed blanks are stack-fed in conventional manner. The blanks, which do not appear in Figure 1, are preferably alike in thickness, size and shape, conforming generally to the outline desired in the laminated-metal article which is to be made, whether it be a cam, gear, rack or other like product. The blanks are preferably punch-formed by conventional dies on conventional presses. If of steel, the blanks may have a thickness varying from as little as .020 to as much as .200 inch, although the usual range will be from .030 to .170 inch. In the form of the invention illustrated in the drawings, the blanks fed to loading stations A, C and E are open-centered blanks, the central opening being provided for the purpose of receiving the fastening element.

As indicated in Figures 2 to 7, inclusive, the method of the present invention may be used in making a cam designated as 15 incorporating three metal blanks 16, 17 and 18 respectively provided with central openings 16a, 17a and 18a that are to be aligned with each other to accommodate the stud-like fastening element 19 by which the cam may later be operated, gripped or engaged, as may be desired. As best shown in Figures 4, 6 and 7, fastening element 19 has a first generally oblong shank 20, an intermediate collar 21 of circular shape, and a second hexagonal shank 22 that serves as an operating portion. The proportions, dimensions and shapes of oblong shank 20, collar 21 and hexagonal shank 22 may be varied within wide limits so long as shank 20, from end to end, measures a few millimeters more than the combined thickness of metal blanks 16, 17 and 18. The reason for this lies in the fact that after consolidating pressure has been applied to blanks 16, 17 and 18, they are to be clamped between collar 21 and a headed-over portion 20a on shank 20 produced by deforming shank 20 by means of a staking tool. Fastening element 19 is preferably formed, as by an automatic screw machine, of steel of characteristics such that it can without undue difficulty be deformed to provide headed-over portion 20a.

Each of the three blanks 16, 17 and 18 used in building up cam 15 is characterized by what, in the case of blank 16, may be described as a central opening 16a, a semicircular portion 16b, a first lobe 16c, a second lobe 16d, and, between them, the bight 16e.

Referring to Figure 1 and particularly to stations A and B, what there takes place is shown diagrammatically in Figures 8, 9 and 10. The first of these three figures illustrates how blank 16 (which is fed from a stack-feeder as previously mentioned) is located over cavity 5 in die 4 at station A. As indicated, there is an appreciable peripheral overlap at the upper end of cavity 5. Such peripheral overlap is intentionally provided in order to make possible the accomplishment of the shaving step illustrated in Figure 9, which is performed at station B. Blank 16 must first be located as described over cavity 5 in die 4 at station A. This having been done, lower carrier 3 is rotated through an arc of 40°. This brings the die carrying blank 16 to station B in operative relation to a plunger 9 provided with a shearing punch 10 and a pilot portion 10a. This plunger is one of the three plungers that are so equipped of the series of plungers 9 mounted on upper carrier 7.

With blank 16 still located in proper relation to cavity 5 in die 4, the plunger is made to move downward, as a result of which portion 10a on shearing punch 10 enters central opening 16a in blank 16. Continued downward movement of shearing punch 10 results in the shaving action diagrammatically illustrated in Figure 9 in which, as blank 16 is forcibly moved into cavity 5 in die 4, chips 25 are formed, the same constituting the overlap that is shaved off by the operation of forcing blank 16 into cavity 5. Figure 9 shows the punch 10 on its way down with the blank 16 half in and half out of cavity 5 in die 4. Figure 10, which likewise illustrates what happens at station B, shows punch 10 moving upward and away from blank 16 after having lodged blank 16 in cavity 5 of die 4 between the upper and lower ends thereof, preferably at or just below the plane of the top face of die 4. Blank 16 is left sticking in cavity 5 of die 4, being retained in place by friction. Chips 25 are blown or brushed away, after which lower carrier 3 is rotated by another 40° in the same direction as before in order to bring to station C the die 4 carrying blank 16.

At station C, the second loading operation is performed, blank 17 being fed from a stack-feeder (not shown) and seated as indicated in Figure 11 immediately above blank 16 in overlapping relation to the die.

With blank 17 in place, lower carrier 3 is rotated through an arc of 40° to bring the die carrying it to station D in juxtaposition to a second shearing punch, shown in Figure 12 and there designated 10'. Shearing punch 10' is caused to descend, as a result of which the pilot portion thereof enters central opening 17a in blank 17 and central opening 16a in blank 16. Continued downward movement of shearing punch 10' forces blank 17 downward into the cavity in the die, thereby shaving off the overlap against the edges of the die cavity. In the meantime, blank 17 forces blank 16 to a lower position in the die. When blank 17 is at or just below the level of the top face of the die, shearing punch 10' is withdrawn as indicated by the arrow in Figure 12, the chips are blown or brushed away, and lower carrier 3 is readied for further rotary movement of 40° from station D (Figure 12) to station E (Figure 13).

At station E, which is the third of the three blank-loading stations, blank 18 is fed to and seated on the die, being positioned as shown in Figure 13 directly above the blank 17 with its edges in overlapping relation to the edges of the die cavity. This having been done, lower carrier 3 is rotated through an additional arc of 40° to station F (Figure 14). At station F, the third of the three shearing punches, shown in Figure 14 and there designated 10'', moves downward into contact with blank 18, the pilot portion thereof meanwhile entering into central openings 18a, 17a and 16a in blanks 18, 17 and 16, respectively. Further movement of shearing plunger 10'' forces blank 18 into the die cavity, displacing blanks 16 and 17 to new positions within the die. Chips are formed as before as blank 18 is shaved against the upper edges of the die cavity. When blank 18 has been lodged in the die, at or below the plane of the top face of the die, shearing plunger 10'' is withdrawn as indicated by the arrow in Figure 14, the chips are swept away, and lower carrier 3 is readied for further movement through a distance of 40° to bring the assembly to station G (Figure 15).

Station G is a fourth loading station, likewise stack-fed from conventional loading means. At station G, the fastening element 19 is introduced into the incompletely formed assembly consisting of blanks 16, 17 and 18. In the form shown, in which fastening element 19 is a stud-like member with an oblong shank 20, the fastening element is so oriented by the feeding mechanism that oblong shank 20 extends toward and is aligned with openings 18a, 17a and 16a in the blanks. As a result, fastening element 19 drops into place in the position shown in Figure 15, in which the shoulder formed where oblong shank 20 impinges on collar 21 abuts against the exposed top face of blank 18. Collar 21, together with the headed-over portion 20a that is formed as hereinafter described on oblong shank 20, clamps blanks 16, 17 and 18 in place to form the laminated-metal cam that is being made by the method of the invention. It will be noted that in Figure 15 oblong shank 20 of fastening element 19 projects downward by an appreciable amount below the lower face of blank 16, thus allowing the heading over operation to be performed.

After further rotating lower carrier 3 to move the incompletely formed assembly, together with the die surrounding it, to station H (Figure 16), the next operation is to bring down back-up punch 11 until the latter makes contact as shown in Figure 16 with the exposed end of hexagonal shank 22 of fastening element 19 and the top face of die 4. To that end, back-up punch 11 has a suitably shaped cavity 26 accommodating collar 21 and hexagonal shank 22 of fastening element 19. With the parts so related, back-up punch 11 holds the incompletely formed assembly in proper position for the performance of the steps that are to be carried out at station H. These steps include consolidating blanks 16, 17 and 18, if necessary, by pressure applied from beneath by annular punch 27, which is introduced through the lower end of the die cavity, followed by the introduction into the cavity, through the central opening in annular punch 27, of a device for mechanically fastening together the parts which go to make up the laminated-metal cam. In the form shown, the device employed in fastening the parts together is a staking tool 28. The latter moves in the direction indicated by the arrow in Figure 16 until it makes contact with the exposed lower end of oblong shank 20, which is deformed by the action of staking tool 28 to form headed-over portion 20a (Figures 3, 4 and 17).

In the step of heading over the end of oblong shank 20 by means of staking tool 28, there is an upsetting action by which the metal of the shank forces its way into engagement with any irregularities that characterize the inner surfaces of central openings 16a, 17a and 18a of blanks 16, 17 and 18, respectively. In forming an open-centered blank by a conventional punching operation, the punched out portion tends to carry away with it some of the contiguous metal, leaving behind one or more cavities of small dimensions adjoining the face of the blank through which the punched-out portion is ejected. Such cavities, which are not ordinarily regarded as defects, are referred to as constituting a "break-away." As an incident to the upsetting of oblong shank 20, the shank swells into the break-away, thus providing enhanced engagement between the shank and the blanks 16, 17 and 18. If desired, the edges of the central openings in blanks 16, 17 and 18 may be chamfered to take further advantage of the tendency of the shank to swell into the break-away, although usually it is not necessary to do more than chamfer the edges of the opening 16a in blank 16 which are to adjoin the end of oblong shank 20.

When the upsetting action has been accomplished, staking tool 28 is retracted and annular punch 27 and back-up punch 11 are withdrawn, leaving the completed laminated-metal article lodged in the upper end of the die cavity.

There remains the step of ejecting the completed article from the die, which can be done either from above or below. To make ready for this step, lower carrier 3 is rotated over an angular distance of 40° until the die is at station I, which is provided with ejection means. Such ejection means may be of any convenient form, but in the embodiment of the invention shown takes the form of a knock-out pin 12 attached to one of the plungers 9 for downward movement within the corresponding plunger holder 8. As plunger 9 descends, knock-out pin 12 comes into contact with the end of hexagonal shank 22 of fastening element 19, bodily displacing the completed article downwardly within the die cavity. This action continues as indicated in Figure 18 until the article is ejected at the open lower end of the die cavity, after which knock-out pin 12 is returned to its original position.

While the above-described cycle of operations is being carried out, the various other dies are similarly used for loading, assembling and staking, all to the end of making it possible to assemble and eject a laminated-metal article with each 40° rotation of lower carrier 3.

This method of forming a laminated-metal article gives a commercially acceptable register as a result of the fact that corresponding edge surfaces of the blanks have been shaved against the same edge portions of the same die. There is complete and perfect alignment of all outwardly projecting parts such as lobes 16c and 16d. To the extent that there is at the center a lack of registry between openings 16a, 17a and 18a of blanks 16, 17 and 18, respectively, this is compensated for by the upsetting which is accomplished on oblong shank 20. The net result is to give a laminated-metal article that is strong, sturdy, and susceptible of being manufactured at a cost which is a fraction of the cost of a like article formed by machine from solid stock. The completed article as ejected from the die is in condition for immediate employment, requiring no machining, polishing, brazing or other finishing operation to prepare it for use.

From what has already been said, it is evident that in its details the invention may be varied within wide limits, as, for example, by increasing or decreasing the number of blanks which are assembled together. Variations are possible in the ways and means used for fastening the blanks together; for example, if desired, blanks may be used which have no center openings, any necessary opening or openings being formed by a suitable sequence of operations while the incompletely formed laminated-metal article is in the die. Other fastening means than the fastening element shown in the drawings may be substituted for that shown and described. If desired, even though not usually considered to be necessary, the laminated-metal article may be plated to give it an even more attractive appearance.

It is intended that the patent shall cover, by summarization in the appended claims, all of the various features of patentable novelty that reside in the invention.

What is claimed is:

1. A method of making a laminated-metal article characterized by an exceptionally high degree of registry between adjacent laminae comprising locating an over-size open-centered metal blank on the exposed face of a hollow die of substantially uniform cross section in a manner such that the blank slightly overlaps the adjacent edges of the die opening and, with the blank so located, applying pressure to the blank to force the blank inwardly of the die to a position between the ends of the die opening, meanwhile shaving off the overlap in the form of a chip; positioning a second over-size open-centered metal blank in similar manner over the opening in the die in contact with the exposed face of the first blank and applying pressure to the both blanks to force second blank inwardly of the die to new positions between the ends of the die opening, meanwhile shaving off the overlap on the second blank in the form of a chip; introducing a deformable fastening element into the open centers of the two blanks while the blanks are still grouped in the opening in the die so as to form a laminated-metal article characterized by the desired high degree of registry between adjacent laminae; and, after the blanks have been fastened to the fastening element, removing the resulting laminated-metal article from the die as a unit.

2. A method of making a laminated-metal article characterized by an exceptionally high degree of registry between adjacent laminae comprising locating an over-size metal blank on the exposed face of a hollow die of substantially uniform cross section in a manner such that the blank slightly overlaps the adjacent edges of the die opening and, with the blank so located, applying pressure to the blank to force the blank inwardly of the die to a position between the ends of the die opening, meanwhile shaving off the overlap in the form of a chip; positioning a second oversize metal blank in similar manner over the opening in the die in contact with the exposed face of the first blank and applying pressure to the second blank to force both blanks inwardly of the die to new positions between the ends of the die opening, meanwhile shaving off the overlap on the second blank in the form of a chip; fastening the two blanks together without otherwise disturbing them while the blanks are still grouped in the opening in the die so as to form a laminated-metal article characterized by a high degree of registry between the laminations; and, after the blanks have been fastened together, removing the resulting laminated-metal article from the die as a unit.

3. A method of making a laminated-metal article characterized by an exceptionally high degree of registry between adjacent laminae comprising locating an over-size piece of sheet metal on the exposed face of a hollow die of substantially uniform cross section in a manner such that the piece overlaps the adjacent edges of the die opening and, with the piece so located, applying pressure to the piece to force the piece inwardly of the die to a position between the ends of the die opening, meanwhile shearing away the overlap; positioning a second over-size piece of sheet metal in similar manner over the opening in the die in contact with the exposed face of the first piece and applying pressure to the second piece to force both pieces inwardly of the die to new positions between the ends of the die opening, meanwhile shearing away the overlap from the second piece; mechanically fastening the pieces to each other without otherwise disturbing them while the pieces are still grouped in the opening in the die; and, after the pieces have been mechanically fastened to each other, removing the resulting laminated-metal article from the die as a unit.

(References on following page)

References Cited in the file of this patent

UNITED STATES PATENTS

| | | |
|---|---|---|
| 392,886 | Shimer | Nov. 13, 1888 |
| 430,892 | Shimer | June 24, 1890 |
| 1,252,289 | Murray, Jr. | Jan. 1, 1918 |
| 1,255,469 | Schlieder | Feb. 5, 1918 |
| 1,558,419 | White | Oct. 20, 1925 |
| 1,571,672 | Jayne | Feb. 2, 1926 |
| 1,618,453 | Lichter | Feb. 22, 1927 |
| 1,814,703 | Johnson | July 14, 1931 |
| 1,967,821 | Hess | July 24, 1934 |
| 1,984,350 | Halsey | Dec. 11, 1934 |
| 2,338,736 | Peterson | Jan. 11, 1944 |
| 2,343,253 | Clark | Mar. 7, 1944 |
| 2,666,252 | Temple | Jan. 19, 1954 |